United States Patent

Barnes

[15] 3,646,981
[45] Mar. 7, 1972

[54] INSERT FOR SANDWICH PANELS
[72] Inventor: Gerald Barnes, Brooklyn, N.Y.
[73] Assignee: Amerace Esna Corporation, New York, N.Y.
[22] Filed: June 2, 1970
[21] Appl. No.: 42,824

[52] U.S. Cl. ............................ 151/41.7, 29/470.5, 52/617, 85/46
[51] Int. Cl. ............................ F16b 35/00, F16b 41/00
[58] Field of Search .................... 151/41.7, 41.73, 41.72, 69; 52/617; 85/32 K, 32, 1 R, 41, 46; 29/470.5, 473.7, 474.4, 432, 472.9

[56] References Cited

UNITED STATES PATENTS

| | | | |
|---|---|---|---|
| 1,062,635 | 5/1913 | Clements | 151/41.7 X |
| 1,260,154 | 3/1918 | Day | 85/41 |
| 3,384,142 | 5/1968 | Phelan | 151/41.73 |
| 3,086,072 | 4/1963 | Forman | 85/1 R X |
| 1,120,403 | 12/1914 | O'Leary | 151/41.73 X |
| 2,199,532 | 5/1940 | Weeks | 151/41.7 UX |
| 3,384,141 | 5/1968 | Kost | 85/1 R X |
| 3,468,358 | 9/1969 | Neuschotz | 151/41.73 X |

FOREIGN PATENTS OR APPLICATIONS 693,317   6/1953   Great Britain ...................... 151/41.73

*Primary Examiner*—Ramon S. Britts
*Attorney*—Samuelson and Jacob

[57] ABSTRACT

A threaded insert is affixed within a sandwich panel with a hardenable liquid adhesive which is forced into intimate contact with the body of the insert by helical ribs on the body which move the liquid adhesive during insertion of the insert into the panel and are engaged by the adhesive to anchor the insert upon hardening of the adhesive. The body is a composite construction including a metallic threaded member surrounded by a sleeve of molded plastic which carries the helical ribs.

5 Claims, 4 Drawing Figures

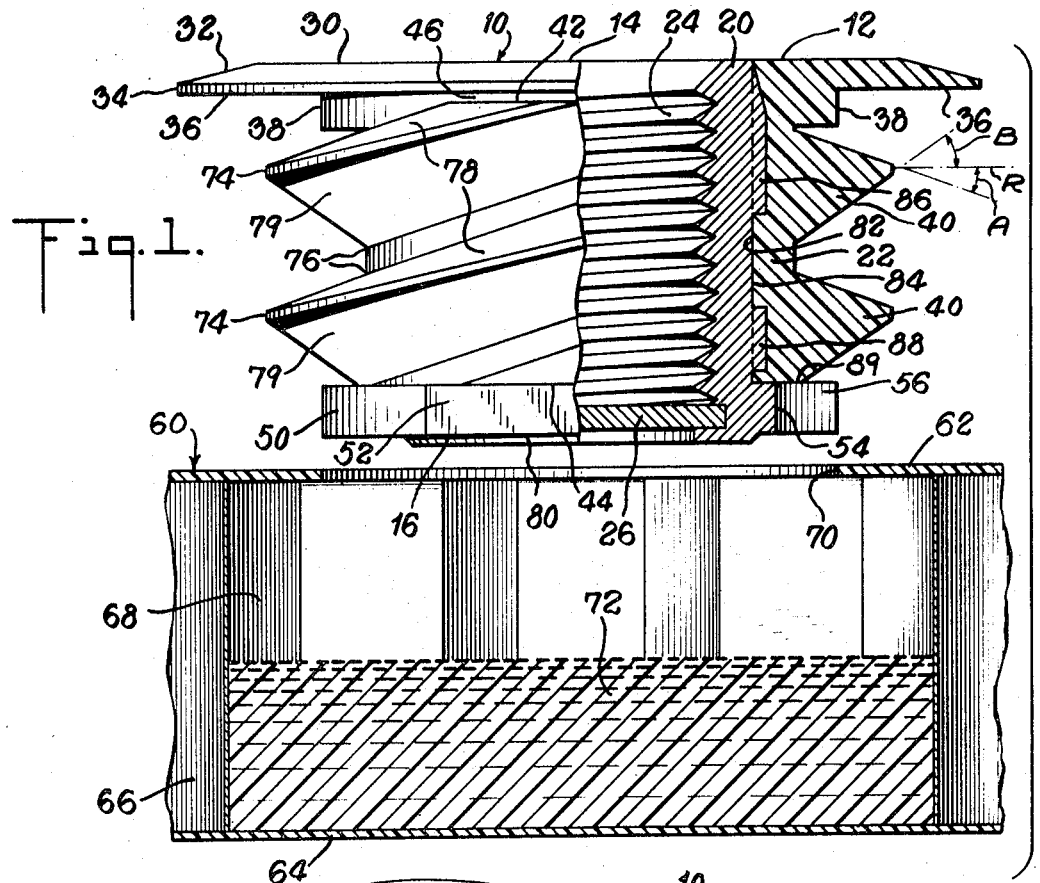
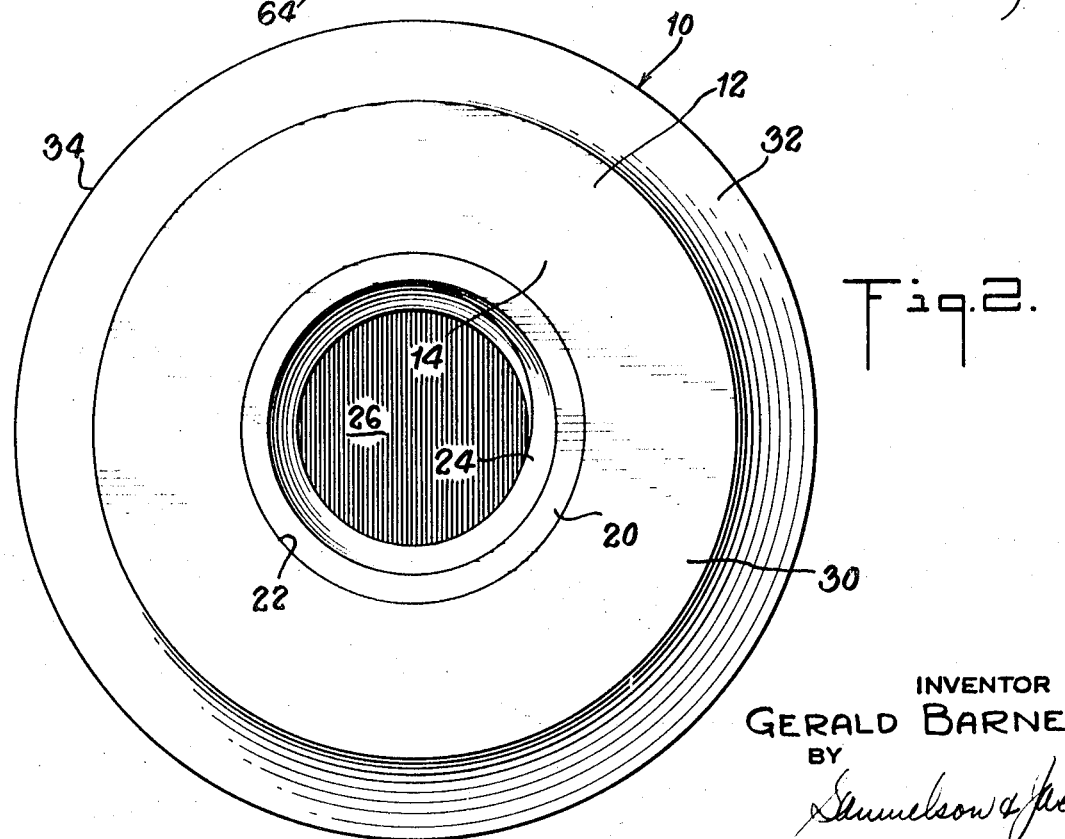

INVENTOR
GERALD BARNES
BY
Samuelson & Jacob
ATTORNEYS

INSERT FOR SANDWICH PANELS

The present invention relates generally to fasteners which are to be affixed to sandwich panels, such as those panels known as "honeycomb" cored structures, and pertains, more specifically, to threaded inserts having a structure which enables these inserts to be anchored within such panels.

The increased demand for high-strength, lightweight panels has led to the increased use of honeycomb cored panels as a means for meeting such requirements. Screw-threaded inserts have been employed in connection with such panels where it is necessary to provide some means for either fastening other structural elements to a panel or fastening the panel to another supporting structure.

Since the structural components of a honeycomb panel usually include an open honeycomb core of relatively thin material sandwiched between a pair of thin facial sheets, problems arise in finding some means for effectively anchoring inserts within these sandwich panels without failure of any of the components of the panel during installation or use of the inserts.

It has been proposed to anchor threaded inserts within sandwich panels by filling a cavity in a panel with a synthetic resin material and then anchoring the insert in the synthetic resin. Such an arrangement allows synthetic resin to become affixed to the honeycomb core, as well as to the facial sheets, to establish an advantageous distribution of the stresses applied to the insert.

In some of these proposals, the cavity is first filled with a liquid synthetic resin which is then allowed to harden. The hardened material is then drilled and an insert is anchored in the drilled hole. Such a procedure requires a multiplicity of operations and occasions a delay in the sequence of operations since the resinous material must be given time to harden between the filling and drilling operations.

In other proposals, the insert is placed within the cavity and an adhesive, generally in the form of a synthetic resin material, is injected, in liquid form, into the cavity around the insert and is allowed to harden. Such proposals require relatively elaborate installation tools and equipment and present a problem in assuring that the insert is properly aligned relative to the panel as the resinous material hardens.

In still further proposals, synthetic resin material is placed within the cavity, in liquid form, and, before the material can harden, an insert is embedded in the resinous material. Subsequently, the resinous material hardens to permanently anchor the insert within the panel. Such proposals have suffered from the lack of intimate contact between the insert and the resinous material, the difficulty of keeping the insert in proper alignment within the cavity upon installation and while the resinous material is hardening and the possibility that the unhardened resinous material can flow out of the cavity either during installation of the insert or after such installation and prior to hardening.

It is therefore an important object of the invention to provide an insert for sandwich panels which insert is to be installed within a cavity in the panel after placing liquid adhesive material within the cavity, but before the material hardens, and which attains effective, intimate contact between the insert and the adhesive material to anchor the insert within the panel.

Another object of the invention is to provide an insert as described above and which will become properly aligned relative to the panel during installation and will remain in such alignment while the adhesive hardens.

Still another object of the invention is to provide an insert as set forth above which tends to preclude escape of the adhesive from the cavity both during and after the installation of the insert, prior to hardening of the adhesive.

A further object of the invention is to provide an insert which is easily installed without complex equipment and without elaborate, time-consuming procedures.

A still further object of the invention is to provide an insert having a composite construction which is easily and inexpensively fabricated in large quantities of uniform quality.

The above objects, as well as still further objects and advantages, are attained by the invention which may be described briefly as an insert for providing fastener means in a sandwich panel having opposite facial sheets of prescribed thickness and a cavity between the sheets for receiving the insert and a hardenable liquid adhesive prior to insertion of the insert, the cavity including an opening of predetermined diameter in one of the sheets, the insert comprising a body having opposite ends and fastener means for receiving a mating fastener member in engagement therewith, a relatively thin lip projecting radially from the body and having a diameter greater than the diameter of the opening to the cavity for being seated upon the sheet carrying the opening and for sealing the opening upon insertion of the body into the cavity, and at least one helical rib projecting radially from the body and extending axially along the body between the lip and one of the opposite ends, the rib having a root diameter no greater than the predetermined diameter of the opening and an apex diameter greater than the predetermined diameter such that the body must be rotated during insertion into the cavity with the concomitant rotation of the helical rib in the liquid adhesive to move the adhesive into intimate contact with the body.

The invention will be more fully understood while further objects and advantages will become apparent in the following detailed description of an embodiment of the invention illustrated in the accompanying drawing, in which:

FIG. 1 is an elevational view, partially sectioned, illustrating an insert constructed in accordance with the invention about to be installed within a sandwich panel;

FIG. 2 is a top plan view of the insert;

Figure 3:
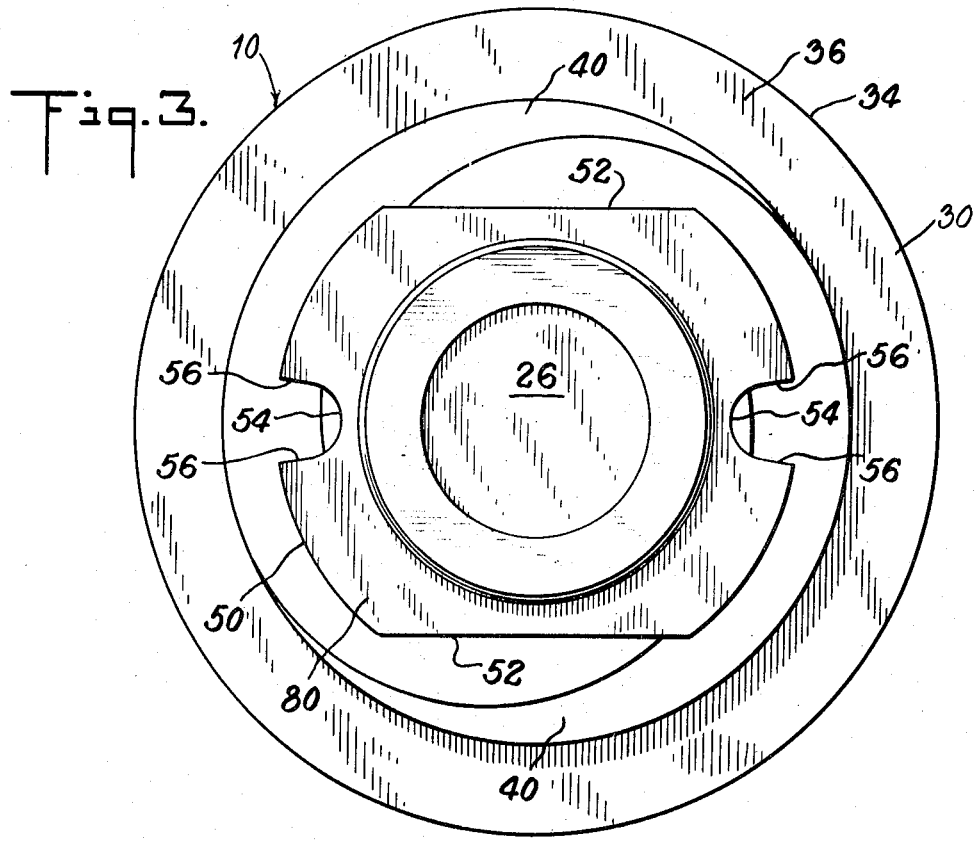
FIG. 3 is a bottom plan view of the insert.

Referring now to the drawing, and especially to FIGS. 1 through 3 thereof, there is illustrated an insert 10 constructed in accordance with the invention, the insert having a body 12 with opposite ends 14 and 16 and fastener means for receiving a mating fastener member in engagement with the body. The body 12 is in the form of a composite construction including an inner tubular member 20, which is preferably fabricated of a metal such as steel, and an outer sleeve 22 surrounding the tubular member 20 and preferably fabricated of a molded plastic material such as, for example, nylon reinforced with glass fibers. The fastener means are shown in the form of an internally threaded aperture 24 extending axially into the tubular member 20, the aperture 24 being open at the upper end 14 for the reception of a mating externally threaded member such as a screw or bolt, and being closed at the lower end 16 by means of a plug 26 permanently affixed to the tubular member 20.

The body 12 of the insert 10 is provided with a lip 30 projecting radially from the outer sleeve 22, the lip 30 being axially thin relative to the overall axial length of the insert 10 and being tapered at 32 toward the outer perimeter 34 of the lip. The underside 36 of the lip 30 provides a planar surface which intersects a generally cylindrical shoulder 38 juxtaposed with the underside of the lip, the purpose of which will be explained hereinafter.

Also projecting radially from the body 12 of the insert 10 are two helical ribs 40, each of which extends along the outer sleeve 22 from an upper edge 42 to a lower edge 44. Each upper edge 42 is spaced a small distance from the underside 36 of the lip 30 to establish a gap 46 for purposes which will be explained below.

Adjacent the lower end 16 of the body 12 of the insert 10 there is provided a flange 50 which projects radially outwardly from the tubular member 20 and which includes a pair of diametrically opposed flats 52 and a pair of diametrically opposed notches 54 extending radially into the flange 50 from the perimeter thereof. Each of the notches 54 includes sidewalls 56 which preferably lie along radial lines.

Insert 10 is to be installed within a sandwich panel 60 which has upper and lower facial sheets 62 and 64, respectively, affixed to a honeycomb core 66. A cavity 68 has been provided within the panel 60 and an opening 70 has been made through the upper facial sheet 62 and communicates with the cavity 68. As seen in FIG. 1, a hardenable adhesive 72, in liquid form, such as, for example, an epoxy resin, has been deposited in the cavity 68 just prior to the insertion of the insert 10. The opening 70 is circular and has a diameter large enough to admit the lower end 16 of the insert 10 and the flange 50 into the cavity 68. However, the diameter of the opening 70 is smaller than the diameter of the outer sleeve 22 at the apexes 74 of the helical ribs 40; hence, further advancement of the insert 10 into the cavity 68 is accomplished by rotating the insert about the central axis thereof. Such rotation of the insert 10 will enable the helical ribs 40 to pass into the cavity 68, the diameter of the outer sleeve 22 at the roots 76 of the helical ribs 40 being no greater than the diameter of the opening 70, and proceed toward the deposit of liquid adhesive 72. Upon engagement of the helical ribs 40 with the deposit of liquid adhesive 72, continued rotation of the insert will not only displace the adhesive but will draw the adhesive upwardly and into intimate contact with the outer surface of the outer sleeve 22 which extends into the cavity 68.

Figure 4:
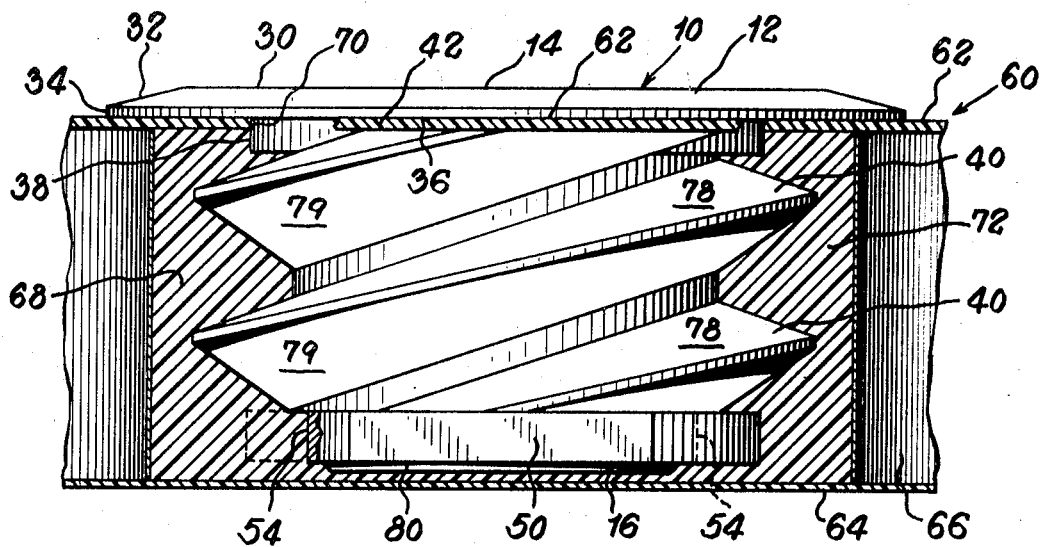
FIG. 4 is an elevational view similar to that of FIG. 1 with the insert installed in the sandwich panel.

When the insert 10 is advanced fully into the cavity 68, the underside 36 of the lip 30 will be seated upon the upper facial sheet 62 and the shoulder 38, which has a diameter corresponding to the diameter of the opening 70, will enter the opening 70, as seen in FIG. 4. The entry of the shoulder 38 into the opening 70 will tend to center the insert 10 within the opening 70, the shoulder 38 thus serving as a pilot surface to aid in the proper alignment of the insert within the opening 70. The diameter of the shoulder 38 is preferably somewhat greater than the diameter of the sleeve 22 at the roots 76 of the helical ribs 40. The gaps 46 between the upper edges 42 of the helical ribs 40 and the underside 36 of the lip 30 are approximately equivalent to the thickness of the upper facial sheet 62 so that the sheet is admitted between the upper edges 42 of the helical ribs 40 and the lip 30 and the insert 10 may be rotated freely after the lip is seated upon the sheet 62, shoulder 38 serving to keep the insert 10 centered during such rotation and cooperating with the opening 70 to facilitate the rotation. Such further rotation will enable the helical intimate 40 to continue to draw liquid adhesive 72 into intimate contact with the flanks of the helical ribs 40 as well as with the remainder of the outer surfaces of the insert within the cavity 68. The flats 52 and the notches 54 of the flange 50, provide open passages through the flange which enable the liquid adhesive to pass more readily from below the flange to the helical ribs 40 so that the helical ribs are more effective in drawing the liquid adhesive into intimate contact with the outer surfaces of the insert. Thus, the flats 52 and notches 54 are so oriented, both with respect to one another and with respect to the helical ribs 40, as to always assure that there is some unobstructed pathway through the flange 50 to the helical ribs. It is noted that the viscosity of the liquid adhesive is such that the above-described rotation of the insert will be effective to force the adhesive into intimate contact with the insert, the action of the helical ribs being in the nature of a pumping action. In addition, the gaps 46 will assure that the insert cannot be removed from the cavity by reversal of the rotation of the insert.

The axial pitch of each helical rib 40 is relatively large and is illustrated as being in the order of magnitude of the length of the insert 10. In this manner, the insert is advanced into the cavity rapidly relative to the amount of rotation of the insert.

The gaps 46 between the upper edges 42 of the helical ribs 40 and the underside 36 of the lip 30 enable the lip to be seated upon the upper facial sheet 62 around the entire perimeter of the lip. Such seating of the lip 30, together with the seating of shoulder 38 within the opening 70, will align the insert relative to the sheet 62 and that alignment will be maintained regardless of the orientation of the panel 60 subsequent to the insertion of the insert 10. In addition, the seating of the lip 30 against the sheet 62, as well as the seating of the shoulder 38 within the opening 70, will tend to seal the cavity 68 against the escape of liquid adhesive 72 through the opening 70 regardless of the orientation of the panel 60 subsequent to the insertion of the insert 10. The plug 26 which seals the lower end of the aperture 24 will prevent adhesive 72 from entering the aperture. Because lip 30 is thin, inset 10 becomes almost flush with the upper surface of the upper sheets 62. The shoulder 38 will tend to keep liquid adhesive from passing out of the opening 70 and between the underside of lip 30 and the upper surface of sheet 62.

Upon completion of the insertion of the insert 10, the liquid adhesive 72 will fill the cavity 68, as seen in FIG. 4, and will harden. The hardened adhesive will engage the first and second flanks 78 and 79, respectively, of the helical ribs 40 to preclude removal of the insert either through rotation thereof or through axial forces applied to the insert. In the illustrated embodiment, the pullout strength of the insert, i.e., the resistance to removal by upwardly directed axial forces, is enhanced by maintaining the angle A made between the first or upper flanks 78, which face the lip 30, and radial plane R at a minimum consistent with ease of fabrication of the helical ribs 40. While, ideally, such pullout resistance would be greatest with angle A reduced to zero, it has been found that angle A can be made approximately the same as the helix angle of the helical ribs 40 to attain advantages of increased pullout resistance while maintaining ease of manufacture. At the same time, the angle B made between the second or lower flanks 79, which are opposite to flanks 78, and radial plane R may be somewhat larger than angle A not only for ease of fabrication, but for facilitating lead-in of the helical ribs 40 as the insert is passed into the opening 70. In this instance, angle A is approximately 20° while angle B is approximately 35°.

In addition to such cooperation between the helical ribs 40 and the hardened adhesive 72, the adhesive will establish a bond between the flange 50 and the lower facial sheet 64 of the panel 60 by virtue of a small clearance between the lowermost lateral surface 80 of the flange and the lower sheet which enables adhesive 72 to effect such a bond. Resistance to rotation of the insert 10 relative to the panel 60 upon hardening of the adhesive 72 is enhanced by the notches 54 in the flange, which will become filled with adhesive upon insertion of the insert, by virtue of the keying effect of the solidified adhesive within the notches. Since the sidewalls 56 of the notches 54 are, in this instance, located along radial lines, any tendency to shear the adhesive from the walls of a notch is minimized and the keying effect is enhanced. Thus, the tubular member 20 itself is anchored by the adhesive 72 within the cavity 68 independent of the anchoring of the outer sleeve 22.

The inner tubular member 20 and the outer sleeve 22 are joined in such a way that relative motion between the component parts will not take place. Hence, the outer sleeve 22 is provided with an annular tongue 82 which is received within a corresponding annular groove 84 in the inner tubular member in order to preclude relative axial movement between the tubular member and the sleeve and the tubular member 20 is knurled along outer surfaces thereof adjacent to the annular groove 84 at 86 and 88 in order to preclude relative rotation between the sleeve 22 and the tubular member 20. Additionally, a second or upper lateral surface 89 of the flange 50 engages the lowermost end of the sleeve 22 in order to transmit upwardly directed axial forces from the tubular member 20 to the sleeve 22.

The above detailed description of an embodiment of the invention is provided by way of example only. Various details of design and construction may be modified without departing from the true spirit and scope of the invention as set forth in the appended claims.

What is claimed is:

1. An insert for providing fastener means in a sandwich panel having opposite facial sheets of prescribed thickness and a cavity between the sheets for receiving the insert and a hardenable liquid adhesive prior to insertion of the insert, said cavity including an opening of predetermined diameter in one of said sheets, said insert comprising:

a body having opposite ends and a composite construction including a tubular metallic member having an internally threaded aperture;

means closing the aperture adjacent one of the opposite ends of the body; and means joining the metallic member and the molded plastic sleeve in a composite assembly;

the molded plastic sleeve including a relatively thin lip projecting radially from the molded plastic sleeve adjacent the other one of said opposite ends of the body and having a diameter greater than the diameter of the opening to the cavity for being seated upon the sheet carrying the opening upon insertion of said body into the cavity, said lip including an underside facing said one of the opposite ends of the body; and at least one helical rib projecting radially from the molded plastic sleeve and extending axially along the body from adjacent the lip to adjacent said one of said opposite ends of the body, said helical rib having a root diameter no greater than the predetermined diameter of the opening and an apex diameter greater than said predetermined diameter, the helical rib including a first flank facing the lip and a second flank opposite to said first flank, the angle made between the first flank and a radial plane being smaller than the angle made between the second flank and the radial plane, said angle between the first flank and the radial plane being approximately the same as the helix angle of the helical rib such that the body must be rotated during insertion in said cavity with concomitant rotation of the helical rib in the liquid adhesive to move the adhesive into intimate contact with the body.

2. The insert of claim 1 wherein said helical rib terminates adjacent the lip to provide a gap between the underside of the lip and the termination of the rib, the gap being approximately equivalent to the prescribed thickness of a corresponding facial sheet for admitting said sheet between the rib and the lip.

3. The insert of claim 2 including a generally cylindrical shoulder on the sleeve juxtaposed with the underside of the lip, said shoulder having a diameter corresponding to the diameter of said opening for being seated within said opening upon insertion of the sleeve into the cavity.

4. The insert of claim 3 wherein:

the metallic member includes an integral flange projecting radially therefrom adjacent said one of the opposite ends of the body, said flange providing a first lateral surface generally parallel to a corresponding facial sheet for adhering said metallic member to said facial sheet and a second lateral surface engaging the molded plastic member for transmitting axially directed forces from said metallic member to said plastic member.

5. The insert of claim 4 wherein:

the flange includes at least one notch extending radially inwardly from the periphery of the flange for providing an open passage through the flange for the liquid adhesive and for increasing the resistance of the adhered flange to rotation in response to rotation of a mating threaded member when the adhesive is hardened.

\* \* \* \* \*

UNITED STATES PATENT OFFICE
CERTIFICATE OF CORRECTION

Patent No. 3,646,981   Dated March 7, 1972

Inventor(s)   Gerald Barnes

It is certified that error appears in the above-identified patent and that said Letters Patent are hereby corrected as shown below:

Column 4, line 5, "inset" should read --insert--
Column 5, between lines 4 and 5, insert --a molded plastic sleeve surrounding the tubular metallic member;--

Signed and sealed this 12th day of September 1972.

(SEAL)
Attest:

EDWARD M. FLETCHER, JR.
Attesting Officer

ROBERT GOTTSCHALK
Commissioner of Patents